United States Patent
Brandt

(10) Patent No.: US 10,024,960 B2
(45) Date of Patent: Jul. 17, 2018

(54) METHOD FOR DETERMINING A DRIVER-SPECIFIC BLIND SPOT FIELD FOR A DRIVER ASSISTANCE SYSTEM, DRIVER ASSISTANCE SYSTEM AND MOTOR VEHICLE

(71) Applicant: VALEO Schalter und Sensoren GmbH, Bietigheim-Bissingen (DE)

(72) Inventor: Timo Brandt, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/532,387

(22) PCT Filed: Nov. 26, 2015

(86) PCT No.: PCT/EP2015/077725
§ 371 (c)(1),
(2) Date: Jun. 1, 2017

(87) PCT Pub. No.: WO2016/087292
PCT Pub. Date: Jun. 9, 2016

(65) Prior Publication Data
US 2017/0329001 A1    Nov. 16, 2017

(30) Foreign Application Priority Data
Dec. 4, 2014    (DE) .................. 10 2014 117 830

(51) Int. Cl.
*G08G 1/16* (2006.01)
*G01S 13/93* (2006.01)
*G06K 9/00* (2006.01)

(52) U.S. Cl.
CPC ........ *G01S 13/931* (2013.01); *G06K 9/00805* (2013.01); *B60R 2300/301* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2009/0063053 A1* | 3/2009 | Basson | .................. | B60Q 9/008 702/1 |
| 2010/0033333 A1* | 2/2010 | Victor | .................... | A61B 3/113 340/576 |

FOREIGN PATENT DOCUMENTS

| | | |
|---|---|---|
| DE | 19904043 A1 | 8/2000 |
| DE | 10220569 A1 | 11/2003 |

(Continued)

OTHER PUBLICATIONS

International Search Report issued in corresponding application No. PCT/EP2015/077725 dated Jan. 29, 2016 (4 pages).
(Continued)

*Primary Examiner* — Travis Hunnings
(74) *Attorney, Agent, or Firm* — Osha Liang LLP

(57) ABSTRACT

The invention relates to a method for operating a driver assistance system (2) for a motor vehicle (1), in which a driver-specific blind spot (3) in the surroundings (4) of the motor vehicle (1) is determined, wherein at least one boundary edge (8, 9) of a driver-specific field of vision (5) of a motor vehicle driver is determined as a function of a movement behavior of the motor vehicle driver's head and/or as a function of the visual faculty of the motor vehicle driver, and the dimension (a2) and/or a local position of the driver-specific blind spot (3) in the surroundings (4) of the motor vehicle (1) is determined as a function of the determined boundary edge (8, 9) of the driver-specific field of vision (5).

18 Claims, 3 Drawing Sheets

(52) U.S. Cl.
CPC .. *B60R 2300/8093* (2013.01); *B60W 2540/28* (2013.01); *G01S 2013/9332* (2013.01)

(56) References Cited

FOREIGN PATENT DOCUMENTS

| | | | |
|---|---|---|---|
| DE | 102008000051 A1 | 8/2008 | |
| DE | 112009004768 T5 | 10/2012 | |
| EP | 1361115 A1 * | 11/2003 | ............. B60Q 9/008 |
| EP | 2741270 A1 | 6/2014 | |

OTHER PUBLICATIONS

Written Opinion of the International Searching Authority issued in corresponding application No. PCT/EP2015/077725 dated Jan. 29, 2016 (5 pages).
German Search Report issued in corresponding application No. 10 2014 117 830.0 dated Dec. 4, 2014 (8 pages).

* cited by examiner

METHOD FOR DETERMINING A DRIVER-SPECIFIC BLIND SPOT FIELD FOR A DRIVER ASSISTANCE SYSTEM, DRIVER ASSISTANCE SYSTEM AND MOTOR VEHICLE

The invention relates to a method for operating a driver assistance system for a motor vehicle, in which a driver-specific blind spot in the surroundings of the motor vehicle is determined. The invention also relates to a driver assistance system and to a motor vehicle.

The term blind spot is used in road traffic to refer to an area in the surroundings of the motor vehicle which cannot be seen by the motor vehicle driver or driver. The blind spot impedes or reduces the driver's vision of the events on the road. This is relevant in particular during lane changing manoeuvres and turning off manoeuvres of the motor vehicle in which the motor vehicle is approached from behind by another road user, for example another motor vehicle but also a pedestrian or a motorcyclist, on an adjacent lane. Other road users such as these are at risk of an accident in the blind spot.

In order to avoid critical traffic situations, the prior art has disclosed driver assistance systems, for example lane change assistants or blind spot assistants which monitor the surroundings, in particular the blind spot of the motor vehicle and warn the driver in the case of a lane change about the threat of collisions with a vehicle which is approaching on a neighbouring lane. For this purpose, dimensions and the position of the blind spot are usually preset at the factory and adapted to the geometry or design of the motor vehicle, for example the size of the motor vehicle and the number of windows and rear view mirrors of the motor vehicle.

However, since a dimension or a position of the blind spot also depends on the physical properties of the driver, for example the body size or visual acuity of the driver, it may be the case that the preset blind spot is not suitable to the same extent for each motor vehicle driver. Therefore, for example DE 10 2008 000 051 A1 proposes a variable warning system for the blind spot for sensing objects in a blind spot of a motor vehicle.

However, according to the prior art the physical properties of the driver are usually only considered to an inadequate extent. In particular given a trend for an increasingly ageing society and the associated limited physical mobility along with a non-reduced desire for mobility, it appears worthwhile to make existing driver assistance systems adaptable, in particular automatically adaptable.

The object of the present invention is to provide a method by means of which a blind spot can be adapted to a motor vehicle driver in a more individual and specific fashion. Furthermore, an object of the invention is to provide a driver assistance system and a motor vehicle.

This object is achieved according to the invention by means of a method, a driver assistance system and a motor vehicle having the features according to the independent patent claims.

In a method according to the invention for operating a driver assistance system for a motor vehicle, a driver-specific blind spot is determined in the surroundings of the motor vehicle. Moreover, at least one boundary edge of a driver-specific field of vision of a motor vehicle driver is determined as a function of a movement behaviour of the motor vehicle driver's head and/or as a function of the visual faculty of the motor vehicle driver, and the dimension and/or a local position of the driver-specific blind spot in the surroundings of the motor vehicle is determined as a function of the at least one determined boundary edge of the driver-specific field of vision.

A boundary edge denotes here, in particular, that boundary or that boundary line of the field of vision which bounds the field of vision laterally with its specific, then in particular two-dimensional, cone, in the case of a projection of the field of vision into a horizontal plane and therefore into a plane which is spanned by the vehicle longitudinal axis and the vehicle transverse axis. The entire lateral boundary edge is then formed by the two boundary lines which bound the cone. In particular in the case of a vehicle driver, that boundary edge which, depending on the seating position of the vehicle driver in the motor vehicle, is located closer to a motor vehicle longitudinal side than the other boundary edge, is of predominant significance for the method according to the invention.

In the context of the invention, the field of vision is denoted as being that area in the surroundings of the motor vehicle which can be perceived by the motor vehicle driver or the driver with his eyes. The field of vision is composed here of a so-called visual field which is dependent on a physical visual faculty or a visual acuity of the driver as well as a shoulder field of vision which is dependent on a turning capability or a turning movement of the driver's head.

The visual field of the driver denotes all the central and peripheral points and objects in the surroundings which can be perceived visually given a steady, straight posture of the head and motionless view which is directed straight ahead, for example given a view through a windshield of the motor vehicle, even without the driver's gaze being directly fixed thereon. A horizontal extent of the visual field, that is to say an angle of aperture of the visual field between two boundarie edges of the visual field in the case of an adult with an average visual faculty is usually approximately 180°. In people with a limited visual faculty, for example relatively low visual acuity, as can occur with increasing age of a person, the horizontal extent of the visual field, that is to say the angle of aperture, can be reduced. As a result, in particular objects which were still visible for a person with an average visual faculty in the vicinity of the boundary edges or a peripheral visual area can no longer be seen by a person with a limited visual faculty.

The shoulder field of vision denotes here that area which the motor vehicle driver can see or perceive visually by a so-called view over the shoulder, that is to say by turning the head about a vertical axis of the driver's seat. An extent of the shoulder field of vision is usually dependent here on a freedom of movement of the head or of a rotational movement of the head which the driver carries out when looking over his shoulder. In other words, the shoulder field of vision of a driver who turns, or can turn, his head only slightly or does not look over his shoulder at all, has a smaller extent than the shoulder field of vision of a driver who, while having the same visual faculty, turns, or can turn, his head through a relatively large angle. The rotational capability or the rotational movement can be limited owing to physical deficits of the driver, for example as a result of reduced mobility in the throat area and/or in the neck area.

The field of vision, in particular an extent of the field of vision, and therefore an overall angle of aperture between the boundary edges of the field of vision up to which the driver can perceive objects in the surroundings is therefore dependent on a physical visual faculty and/or on a rotational movement of the driver's head. A driver-specific field of vision, which has a driver-specific angle of aperture between two boundary edges of the driver-specific field of vision, is determined on the basis of the individual visual faculty of the driver and/or the individual rotational movement of the driver's head.

A position and/or a dimension of the driver-specific blind spot is adapted as a function of this determined boundary edge. Therefore, in particular objects which are already located in the driver's field of vision in the case of a driver with an average visual faculty, but in the case of a driver with a limited visual faculty continue to be located in the driver's driver-specific blind spot, can be sensed by the driver assistance system. It is therefore possible, for example, for a visual and/or acoustic warning signal or alarm signal to be generated if the object, for example another motor vehicle, is located in the driver-specific blind spot of the driver.

The method according to the invention therefore has the advantage that physical properties of the driver and modes of behaviour of the driver are taken into account in the determination of the blind spot. Therefore, it is possible to monitor areas in the surroundings of the motor vehicle which cannot be seen by the driver owing, for example, to physical limitations of said driver.

The driver-specific blind spot is particularly preferably determined in its dimensions and/or in its local position adjacent to the boundary edge of the driver-specific field of vision and/or is determined in an overlapping fashion in a predefined overlapping area with the driver-specific field of vision. The boundary edges of the driver-specific field of vision are obtained by means of the overall angle of aperture by which the driver can turn his head when looking over his shoulder in the direction of the window of the driver's side and when looking through the centre of the vehicle when reversing. The driver-specific blind spot is advantageously determined in an overlapping fashion adjacent to these boundary edges and/or in the predefined overlapping area with the driver-specific field of vision. If the blind spot is, in fact, not adapted to the driver-specific field of vision and is, for example, not selected in an adjacent fashion, it may be the case that objects which are located in an area which is not monitored either by the driver assistance system or by the driver himself are overlooked and therefore an alarm signal is not triggered. However, if the blind spot is selected in such a way that the blind spot extends beyond the predefined overlapping area into the driver-specific field of vision, it may be the case that the driver is unnecessarily warned by the alarm signal even though the driver can already recognize the object by looking over his shoulder.

According to an advantageous refinement of the invention, the driver-specific blind spot is changed in its dimensions parallel to a longitudinal axis of the motor vehicle as a function of the at least one boundary edge of the driver-specific field of vision. The blind spot through which, for example, a lane adjacent to the driver's side is to be monitored can be configured, for example, as a rectangular area. The dimension or a spatial extent parallel to the longitudinal axis of the motor vehicle, for example a length of the blind spot, is changed as a function of the determined boundary edge of the driver-specific field of vision. In this context, in particular the blind spot of a driver whose field of vision has, for example owing to a limited visual faculty and/or a limited head turning movement, a low angle of aperture, has a larger dimension, for example a larger length, than the blind spot of an average, unlimited driver.

The driver-specific blind spot is preferably determined by virtue of the fact that a predefined reference blind spot is changed as a function of the determined movement behaviour of the motor vehicle driver's head and/or as a function of the determined visual faculty of the motor vehicle driver. Such a reference field of vision can be predefined, for example, by settings at the factory and can correspond to a field of vision of a driver with an average body size, standardized freedom of movement of his head and standardized visual faculty. In accordance with this reference field of vision, a reference blind spot is preset or predefined. In order to predefine the driver-specific blind spot it is possible to increase the reference blind spot if the determined driver-specific field of vision is limited compared to the reference field of vision, that is to say if the driver-specific field of vision has a smaller angle of aperture than the reference field of vision. This can be done, for example, in the case of an older person whose visual faculty is impaired or in the case of a person who, owing to physical deficits, for example reduced mobility in the throat area or neck area, cannot turn his head far enough. On the other hand, in the case of a driver who sees particularly well and/or is particularly mobile, the reference blind spot can be reduced in order to predefine the driver-specific blind spot.

There can be provision that in the case of a movement behaviour which is limited in comparison with the reference blind spot and/or a limited visual faculty of the vehicle driver, the reference blind spot is lengthened in the forward direction along a direction of locomotion of the motor vehicle in order to generate the driver-specific blind spot. Here, in particular the blind spot which is located to the side of the motor vehicle and is to be monitored in the case of lane changing manoeuvres by the motor vehicle is considered. An unchanged predefined reference blind spot would also not cover the area which is not perceived by the driver owing to the limited mobility and/or the limited visual faculty.

Therefore, the reference blind spot in the forward direction, that is to say in the direction of locomotion of the motor vehicle, is lengthened. On the other hand, a rear limitation of the blind spot is preferably not changed. Therefore, for example a driver with limited visual faculty and/or movement behaviour and a driver with normal visual faculty and/or movement behaviour are warned as soon as another vehicle approaches the motor vehicle from the rear on the neighbouring lane and drives into the blind spot. Since the rear boundary edge has not changed, both drivers are warned at the same time. However, as soon as the other vehicle exits the blind spot, for example because it has overtaken the motor vehicle, the drivers are no longer warned. Since the driver-specific blind spot of the limited driver is lengthened in the forward direction, the warning is ended at a later time, since the other vehicle exits the driver-specific blind spot at a later time owing to the greater length.

One preferred embodiment provides that the movement behaviour of the motor vehicle driver's head and/or the visual faculty of the motor vehicle driver are/is sensed a plurality of times, and the driver-specific field of vision is determined from an averaged movement behaviour of the head and/or from an averaged visual faculty. Therefore, an actual movement behaviour of the head and an actual visual faculty of the motor vehicle driver can be determined in a reliable way. It is therefore possible to prevent, for example, that a limited movement behaviour is determined for a driver who, for example, forgets to look over his shoulder once and subsequently makes a disproportionately large selection for the driver-specific blind spot. By repeatedly sensing it is also possible to detect temporary limitations, for example a temporary injury to the neck or throat, and the driver-specific blind spot can be temporarily adapted to the limited field of vision of the driver.

It proves advantageous if the sensed driver-specific field of vision and/or the driver-specific blind spot are/is stored after the motor vehicle is shut down, and is made available when the motor vehicle is driven again by the motor vehicle driver. The driver-specific field of vision and therefore the driver-specific blind spot can be stored, for example, on a vehicle-internal medium or vehicle-external medium. If, for example, a plurality of drivers use or drive the motor vehicle, a profile with the driver's driver-specific field of vision or driver-specific blind spot can be stored for each driver. Such a vehicle-external medium can be, for example, a vehicle key of the respective driver. Therefore, each driver can be identified on the basis of his vehicle key, and the corresponding driver-specific field of vision and the driver-specific blind spot can be made available right at the start of the journey. However, it is also possible to provide that respective drivers can be identified by means of a recording device, for example by means of a camera arranged in the driver's cab. The corresponding profile with the driver-specific field of vision or the driver-specific blind spot, which is stored, for example, on a vehicle-internal storage medium, can then be retrieved and made available. Therefore, the driver-specific field of vision and therefore the driver-specific blind spot does not have to be newly calculated for each journey. The methods specified here for the driver identification are merely exemplary and not conclusive.

The driver-specific field of vision which is stored and made available is preferably adapted to a movement behaviour of the motor vehicle driver's head and/or visual faculty of the motor vehicle driver determined while the motor vehicle is driven again. Therefore, for example the driver-specific field of vision and therefore the driver-specific blind spot can be continuously improved by determining the driver-specific blind spot by averaging all the determined driver-specific fields of vision. The driver-specific field of vision can also be adapted if it is determined that a driver has, in comparison with the last journey, for example a limited freedom of movement of his head, for example as a result of an injury.

There can be provision that an object which approaches the motor vehicle from behind in the surroundings and a position of the object, in particular relative to the motor vehicle, are sensed in the surroundings, a spontaneous movement reaction of the motor vehicle driver to the object and a time of the spontaneous movement reaction are sensed, and a position of the driver-specific boundary edge is determined as that position which the object, in particular a front side of the object, had at the time of the sensed spontaneous movement reaction in the surroundings, in particular relative to the motor vehicle. By sensing the movement reaction, a visual faculty and/or a rotational movement of the driver's head can be determined. For this purpose, an object and the position thereof in the surroundings of the motor vehicle are observed. For this purpose, the object and the position thereof in the surroundings can be sensed continuously or at predefined times, for example by means of a vehicle mounted sensing device.

As soon as the object enters the field of vision, in particular a peripheral visual field, of the vehicle driver, that is to say passes through the boundary edge of the driver-specific field of vision and the vehicle driver makes a spontaneous reaction, for example a change in his viewing direction or a turning movement, this spontaneous reaction is sensed and the object is identified at this time as being located at the boundary edge.

In one refinement of the invention, a motor vehicle which approaches a motor vehicle rear of the motor vehicle in the same direction of locomotion on an adjacent lane is sensed as the object. Such a vehicle is generally sensed, in the case of an active lane change assistant, by a vehicle mounted sensing device in order to warn the driver in the case of a possible lane change. At the same time, by means of the method according to the invention a reaction or a spontaneous reaction of the driver to the vehicle which is approaching from the rear can be sensed and used to determine the driver-specific field of vision.

The object is preferably sensed by means of at least one vehicle-mounted radar sensor. Such radar sensors which are known per se can be arranged on an outer side of the motor vehicle and can sense objects and their positions in the surroundings of the motor vehicle.

The movement reaction of the driver is advantageously sensed by means of at least one vehicle-mounted camera. Such a camera can be arranged, for example, in a vehicle cab of the motor vehicle and can sense a position and a movement of the driver's head. Such cameras can be part of a so-called head tracking system and can sense the freedom of movement of the head, in particular an azimuth and elevation, of the respective driver. In addition, a view or a viewing direction of the vehicle driver can also be recorded by means of the camera. This is also referred to as eye tracking. In particular, the object which is sensed by the radar sensor and the movement reaction which is recorded by the camera are used to determine the driver-specific field of vision.

The invention also comprises a driver assistance system which is configured to carry out a method as claimed in one of the preceding claims. Such a driver assistance system can be, for example, what is referred to as a lane change assistant or a so-called blind spot assistant ("blind spot detection").

A motor vehicle according to the invention comprises a driver assistance system according to the invention. The motor vehicle is embodied, in particular, as a passenger car.

The preferred embodiments which are presented with respect to the method according to the invention, and the advantages thereof, apply correspondingly to the driver assistance system according to the invention and the motor vehicle according to the invention.

Further features of the invention can be found in the claims, figures and the description of the figures. The features and combinations of features which are specified in the description above and the features and combinations of features which are specified below in the description of the figures and/or are only shown in the figures can be used not only in the respectively specified combination but also in other combinations or alone without departing from the scope of the invention. Embodiments of the invention which are not explicitly shown or explained in the figures but arise and can be produced by separate combinations of features from the explained embodiments are therefore also to be considered as included and disclosed. Embodiments and combinations of features which therefore do not have all the features of an originally formulated independent claim are also to be considered as disclosed.

In the text which follows the invention will now be explained in more detail by means of a preferred exemplary embodiment and with reference to the appended drawing, in which.

Identical or functionally identical elements in the figures are provided with the same reference symbols.

Figure 1:
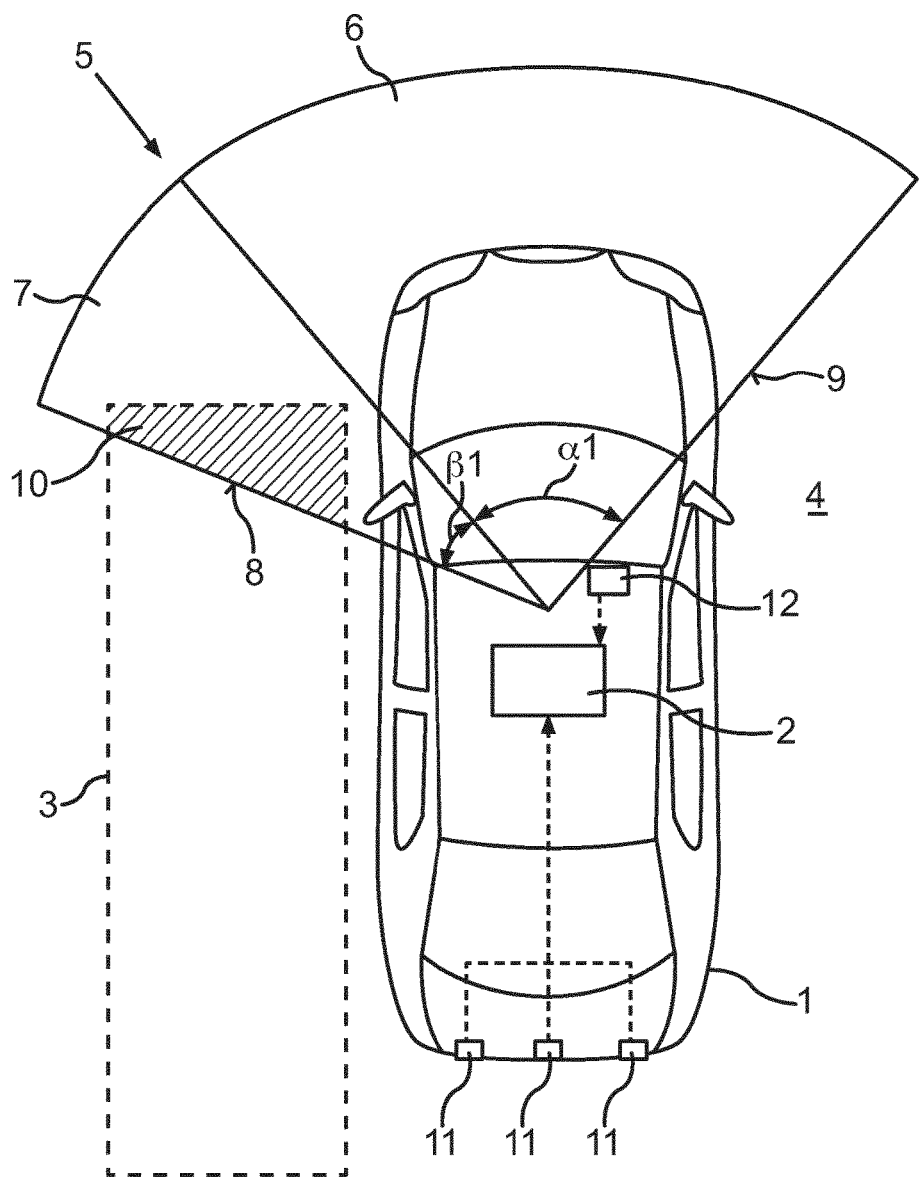
FIG. 1 shows a schematic illustration of a motor vehicle with an embodiment of the driver assistance system according to the invention.
Figure 2:
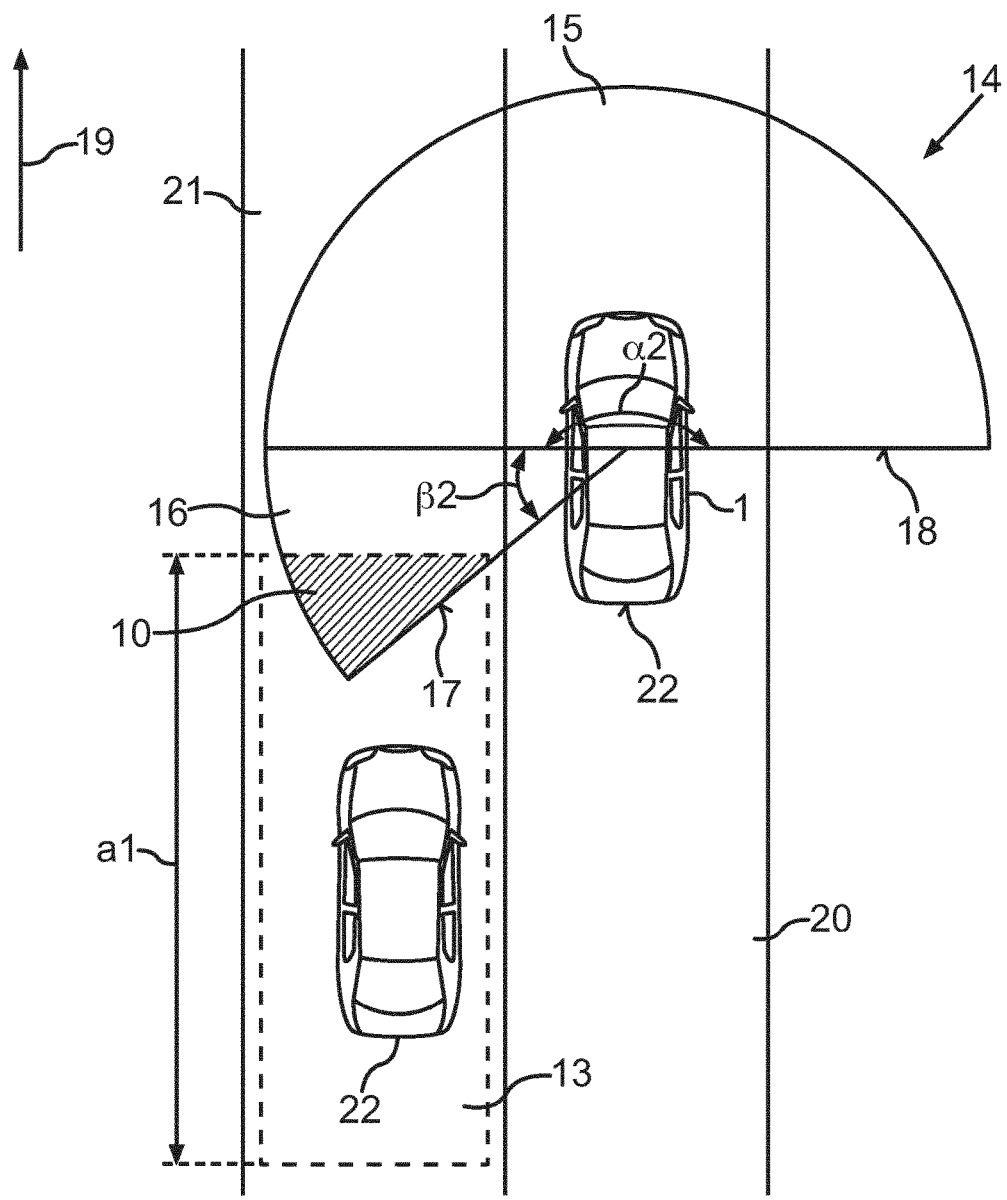
FIG. 2 shows a schematic illustration of a motor vehicle with a reference blind spot and a reference field of vision.
Figure 3:
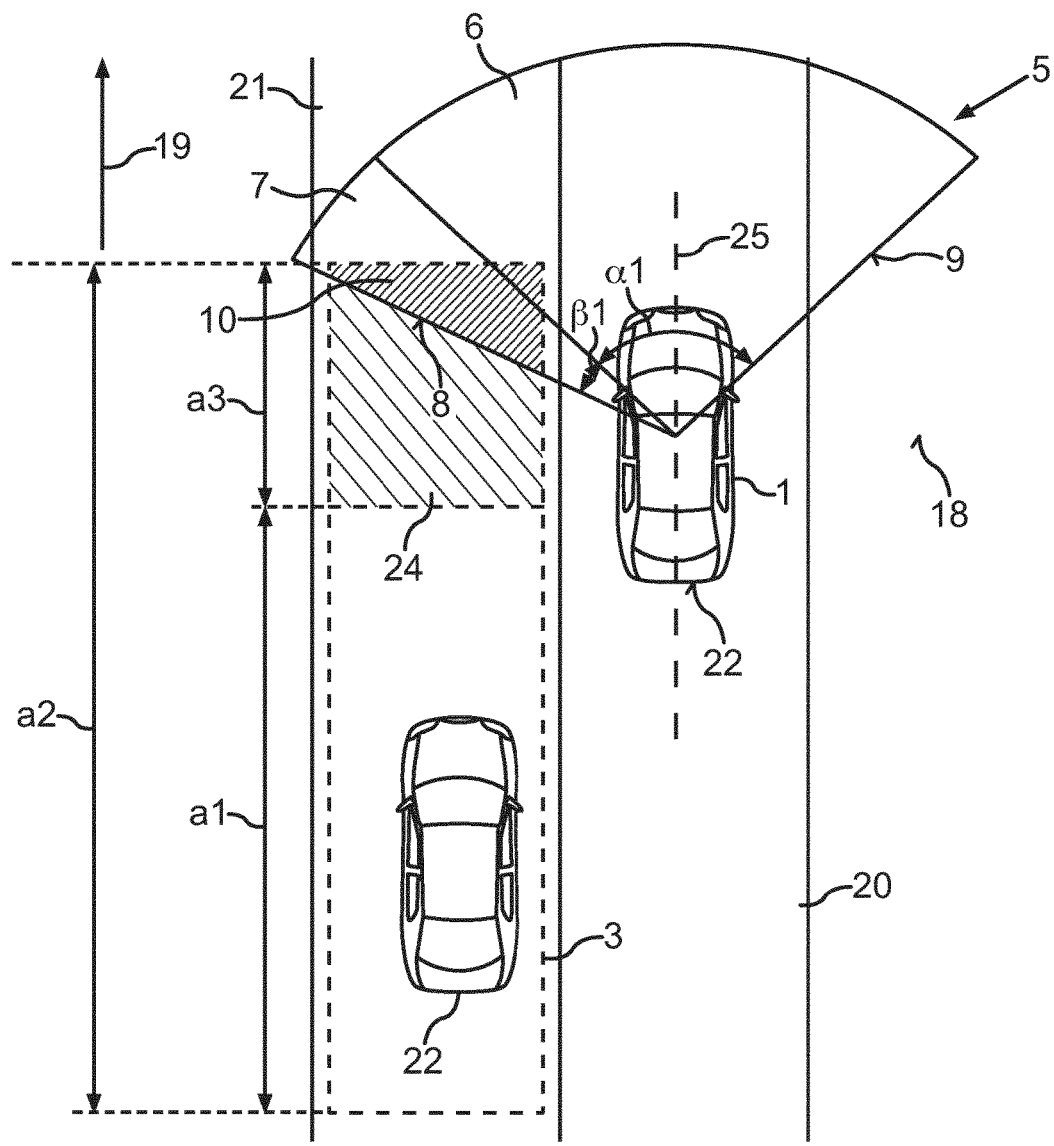
FIG. 3 shows a schematic illustration of a motor vehicle with a driver-specific field of vision and a driver-specific blind spot adapted thereto.

FIG. 1 shows a motor vehicle 1 with a driver assistance system 2. The driver assistance system 2 can be configured, for example, as a lane change assistant or a blind spot assistant. The driver assistance system 2 is also configured to determine a driver-specific blind spot 3 in the surroundings 4 of the motor vehicle 1. The driver-specific blind spot 3 is an area which cannot be seen by a motor vehicle driver or a driver of the motor vehicle 1 (not illustrated here), and said blind spot 3 is located here on a driver side next to the motor vehicle 1. In this context, the driver of the motor vehicle 1 can be warned by the driver assistance system 2, for example by a visual and/or acoustic signal, if another object, for example another vehicle 23 according to FIG. 2 and FIG. 3, is located in the driver-specific blind spot 3.

Furthermore, the driver assistance system 2 is configured to determine the driver-specific blind spot 3 as a function of a driver-specific field of vision 5 of the motor vehicle driver. The driver-specific field of vision 5 is illustrated in a projection or in a section in a horizontal plane, and is therefore shown in a parallel illustration to a roadway on which the motor vehicle 1 is located. The driver-specific field of vision 5 comprises here a so-called visual field 6 and a so-called shoulder field of vision 7. The visual field 6 shows here an area which the driver can perceive in the normal position, that is to say when looking straight ahead through a front windshield of the motor vehicle 1. The visual field 6 is, in particular, dependent on the visual faculty as a physical property of the motor vehicle driver. The visual field 6 has here an angle of aperture $\alpha 1$, wherein a visual field of a person with an average, good visual faculty has a larger angle of aperture than a visual field of a person with a limited, poor visual faculty. This means that the angle of aperture $\alpha 1$ increases the better the visual faculty of the person.

The shoulder field of vision 7 is that area which the driver can additionally perceive by looking over his shoulder, that is to say by means of a turning movement of his head. The larger the turning movement or the freedom of movement of the head, the larger an angle of aperture $\beta 1$ of the shoulder field of vision 7.

The visual field 6 which is shown merely as a schematic example and the shoulder field of vision 7 which is shown merely as a schematic example therefore form here the driver-specific field of vision 5 which is bounded in the planar, and therefore 2-dimensional, projection illustration by a left-side boundary edge 8 and a right-side boundary edge 9, and has an overall angle of aperture $\alpha 1+\beta 1$. The driver or vehicle driver can therefore perceive visually all those objects which are located within the area bounded by the boundary edges 8 and 9, that is to say within the driver-specific field of vision 5. Those objects which are located on the other side of the boundary edges 8 and 9 in the surroundings 4, that is to say outside the driver-specific field of vision 5, cannot be perceived visually by the driver. These areas will be covered, in particular, by the driver-specific blind spot 3.

The driver-specific blind spot 3 occurs in the surroundings 4 of the motor vehicle 1 in such a way that the driver-specific blind spot 3 is adjacent to the boundary edge 8, and/or the driver-specific field of vision 5 and the driver-specific blind spot 3 overlap in a predefined overlapping area 10. Therefore, the surroundings 4 can be monitored comprehensively by the driver and the driver assistance system 2.

In order to determine the driver-specific field of vision 5, the motor vehicle 1 can have radar sensors 11 which sense the surroundings 4, in particular objects, for example the other vehicle according to FIG. 2 and FIG. 3, and the positions thereof relative to the motor vehicle 1.

In addition, the motor vehicle 1 can have, in a passenger compartment, a camera 12, a so-called head tracking camera, which can record a movement of the driver's head and/or a viewing direction of the driver. It is therefore possible to sense, for example, a spontaneous reaction of the driver to the object sensed by the radar sensors 11, for example the other vehicle 23, which approaches the motor vehicle 1 from behind. The spontaneous reaction of the driver occurs, in fact, in particular when the object enters the peripheral visual field, that is to say the driver-specific field of vision 5, that is to say for example passes through the boundary edge 8. The position of the object, sensed by the radar sensors 11, with respect to the time of the spontaneous reaction of the driver is determined as the position of the boundary edge 8. Likewise, the position of the boundary edge 9 can be determined. Therefore, the driver-specific field of vision 5 can be determined in a particularly simple way.

FIG. 2 shows a motor vehicle 1 with a reference blind spot 13 which is predefined as a function of a reference field of vision 14 and is generally predefined at the factory. The reference field of vision 14 has a reference field of vision 15 which comprises an area which a driver with an average visual faculty can perceive visually. The reference visual field 15 has here an angle of aperture $\alpha 2$ of approximately 180°. The reference field of vision 14 also comprises a reference shoulder field of vision 16 with an angle of aperture $\beta 2$. The reference field of vision 14 is bounded here by a left-side reference boundary edge 17 and a right-side reference boundary edge 18 and has an overall angle of aperture $\alpha 2+\beta 2$.

The reference blind spot 13 is determined adjacent to the reference boundary edge 17 or in an overlapping fashion in the overlapping area 10 with the reference field of vision 14. The reference blind spot 13 has here a dimension a1 as a vertical extent.

The motor vehicle 1 moves here in a direction 19 of locomotion on a lane 20. On a lane 21 which is adjacent to the lane 20 a rear area 22 of the motor vehicle 1 is approached by another vehicle 23 which is also moving in the direction 19 of locomotion. The other vehicle 23 is already located within the reference blind spot 13 here. In this context, the driver of the motor vehicle 1 can be informed about the other vehicle 23, for example by a visual and/or acoustic signal, and can therefore be warned about a possible collision of the motor vehicle 1 with the other vehicle 23 in the case of a lane change of the motor vehicle 1 onto the adjacent lane 21. As soon as the other vehicle 23 moves further in the direction 19 of locomotion and exits, for example, a front area of the reference blind spot 13 located in the direction 19 of locomotion, the other vehicle 23 is located in the reference field of vision 14, in particular, in the reference shoulder field of vision 16, of the driver after exiting the reference blind spot 13, and can therefore be perceived visually by said driver.

FIG. 3 shows a motor vehicle 1 in which the driver-specific field of vision 5 has been determined by the driver assistance system 2 as a function of the visual faculty and/or the turning capability of the motor vehicle driver's head. The driver-specific field of vision 5 which is illustrated here has a smaller overall angle of aperture α1+β1 in comparison with the overall angle of aperture α2+β2 of the reference field of vision 14 according to FIG. 2. The driver-specific field of vision 5 is therefore limited compared to the reference field of vision 14. It can be assumed, for example, that the vehicle driver in the exemplary embodiment according to FIG. 3 has a relatively poor visual faculty and/or a smaller freedom of movement of his head than the vehicle driver in the exemplary embodiment according to FIG. 2.

The driver-specific blind spot 3 is defined as a function of the driver-specific field of vision 5. The driver-specific blind spot 3 has here a dimension a2 as the vertical extent, with the result that the driver-specific blind spot 3 extends as far as the boundary edge 8 of the driver-specific field of vision 5, or the driver-specific field of vision 5 is covered in the overlapping area 10. However, if a blind spot which corresponds to the reference blind spot 13, that is to say has a dimension a1 as the vertical dimension, were to be made available for the vehicle driver with the driver-specific field of vision 5 which is limited compared to the reference field of vision 14, an area 24 would result which cannot be perceived or monitored either by the driver himself or by the driver assistance system 2. If the other vehicle 23 which the motor vehicle 1 overtakes, for example, on the left were then to be located in the area 24, a lane change of the motor vehicle 1 on the adjacent lane 21 would lead to a collision with the other vehicle 23, since the driver cannot see the vehicle 23, nor can he be informed about the other vehicle 23 by the driver assistance system 2.

In order to prevent such a collision, the reference blind spot 13 is lengthened in the forward direction in the direction 19 of travel in order to determine the driver-specific field of vision 5. In particular, the dimension a1 of the reference blind spot 13 is lengthened with respect to a longitudinal axis 25 of the motor vehicle 1 by the dimension a3 to form the dimension a2 as the vertical dimension, with the result that the driver-specific blind spot 3 is adjacent to the boundary edge 8 or overlaps with the driver-specific field of vision 5 in the overlapping area 10. Therefore, the driver can be informed about the other vehicle 23 by the driver assistance system 2 until the vehicle exits the driver-specific blind spot 3 in the forward direction and can be perceived visually by the driver himself in his driver-specific field of vision 5.

The invention claimed is:

1. A method for operating a driver assistance system for a motor vehicle, in which a driver-specific blind spot in the surroundings of the motor vehicle is determined, the method comprising:
   determining at least one boundary edge of a driver-specific field of vision of a motor vehicle driver as a function of one selected from the group consisting of: a movement behaviour of the motor vehicle driver's head, and the visual faculty of the motor vehicle driver; and
   determining a dimension and a local position of the driver-specific blind spot in the surroundings of the motor vehicle as a function of the determined boundary edge of the driver-specific field of vision,
   wherein the movement behaviour of the motor vehicle driver's head and the visual faculty of the motor vehicle driver are sensed a plurality of times, and the driver-specific field of vision is determined from an averaged movement behaviour of the head and an averaged visual faculty.

2. The method according to claim 1, wherein the driver-specific blind spot is determined in corresponding dimensions and/or in a local position adjacent to the boundary edge and/or is determined in an overlapping fashion in a predefined overlapping area with the driver-specific field of vision.

3. The method according to claim 1, wherein the driver-specific blind spot is changed in corresponding dimensions parallel to a longitudinal axis of the motor vehicle as a function of the boundary edge of the driver-specific field of vision.

4. The method according to claim 1, wherein the driver-specific blind spot is determined by virtue of the fact that a predefined reference blind spot is changed as a function of the determined movement behaviour of the motor vehicle driver's head and/or as a function of the determined visual faculty of the motor vehicle driver of the motor vehicle.

5. The method according to claim 4, wherein in the case of a movement behaviour which is limited in comparison with the reference blind spot and/or a limited visual faculty of the vehicle driver, the reference blind spot is lengthened in the forward direction along a direction of locomotion of the motor vehicle in order to generate the driver-specific blind spot.

6. The method according to claim 1, wherein the sensed driver-specific field of vision is stored after the motor vehicle is shut down, and is made available when the motor vehicle is driven again by the motor vehicle driver.

7. The method according to claim 6, wherein the driver-specific field of vision which is stored and made available is adapted to a movement behaviour of the motor vehicle driver's head and/or visual faculty of the motor vehicle driver determined while the motor vehicle is driven again.

8. The method according to claim 1, wherein an object which approaches the motor vehicle from behind in the surroundings and a position of the object relative to the motor vehicle, are sensed in the surroundings, a movement reaction of the motor vehicle driver to the object and a time of the movement reaction are sensed, and a position of the driver-specific boundary edge is determined as that position which the object had at the time of the sensed movement reaction in the surroundings.

9. The method according to claim 8, wherein a motor vehicle which approaches a motor vehicle rear of the motor vehicle in the same direction of locomotion on an adjacent lane is sensed as the object.

10. The method according to claim 8, wherein the object is sensed by at least one vehicle mounted radar sensor.

11. The method according to claim 8, wherein the movement reaction of the motor vehicle driver is sensed by at least one vehicle-mounted camera.

12. A driver assistance system which is configured to carry out a method according to claim 1.

13. A motor vehicle having a driver assistance system according to claim 12.

14. A method for operating a driver assistance system for a motor vehicle, in which a driver-specific blind spot in the surroundings of the motor vehicle is determined, the method comprising:
   determining at least one boundary edge of a driver-specific field of vision of a motor vehicle driver as a function of one selected from the group consisting of: a movement behaviour of the motor vehicle driver's head, and the visual faculty of the motor vehicle driver; and
   determining a dimension and a local position of the driver-specific blind spot in the surroundings of the motor vehicle as a function of the determined boundary edge of the driver-specific field of vision, wherein the movement behaviour of the motor vehicle driver's head and the visual faculty of the driver is sensed by at least one vehicle-mounted camera, and wherein the movement behaviour of the motor vehicle driver's head and the visual faculty of the driver are a forward visual acuity of the driver as well as a shoulder field of vision which is dependent on a turning capability of the driver's head as sensed by the at least one vehicle-mounted camera.

15. The method according to claim 14, wherein the driver-specific blind spot can be stored as a driver-specific profile for future use on a vehicle-external medium.

16. The method according to claim 15, wherein, in response to detecting the driver-specific profile, the motor vehicle automatically adapts to the driver-specific blind spot.

17. The method according to claim 16, wherein the driver-specific profile is automatically detected using a plurality of sensors on board the motor vehicle.

18. A method for operating a driver assistance system for a motor vehicle, in which a driver-specific blind spot in the surroundings of the motor vehicle is determined, the method comprising:

determining at least one boundary edge of a driver-specific field of vision of a motor vehicle driver as a function of one selected from the group consisting of: a movement behaviour of the motor vehicle driver's head, and the visual faculty of the motor vehicle driver; and determining a dimension and a local position of the driver-specific blind spot in the surroundings of the motor vehicle as a function of the determined boundary edge of the driver-specific field of vision, wherein the visual faculty of the driver is sensed by at least one vehicle-mounted camera, and wherein the driver-specific blind spot can be stored as a driver-specific profile for future use on a vehicle-external medium.

* * * * *